(12) United States Patent
Sugiyama

(10) Patent No.: US 8,643,921 B2
(45) Date of Patent: Feb. 4, 2014

(54) IMAGE READER

(75) Inventor: Kentaro Sugiyama, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 385 days.

(21) Appl. No.: 13/076,573

(22) Filed: Mar. 31, 2011

(65) Prior Publication Data

US 2011/0242619 A1    Oct. 6, 2011

(30) Foreign Application Priority Data

Mar. 31, 2010    (JP) .................................. 2010-082121

(51) Int. Cl.
*H04N 1/46* (2006.01)
*H04N 1/04* (2006.01)

(52) U.S. Cl.
USPC ............ 358/509; 358/475; 358/505; 358/474

(58) Field of Classification Search
USPC ......... 358/509, 505, 506, 512–514, 475, 497, 358/474, 483, 482; 399/220, 221; 355/67–71
See application file for complete search history.

(56) References Cited

U.S. PATENT DOCUMENTS

| 5,625,470 | A | * | 4/1997 | Ueta et al. ....................... 358/505 |
| 6,084,692 | A | * | 7/2000 | Ohtani et al. ................... 358/509 |
| 6,456,748 | B1 | | 9/2002 | Yushiya et al. |
| 6,545,777 | B1 | * | 4/2003 | Amimoto ........................ 358/509 |
| 6,785,026 | B1 | * | 8/2004 | Terajima et al. .............. 358/509 |
| 7,529,003 | B2 | * | 5/2009 | Fukawa ........................ 358/505 |
| 7,884,978 | B2 | * | 2/2011 | Ikeno et al. .................... 358/509 |
| 2009/0296172 | A1 | * | 12/2009 | Iwatsuka ....................... 358/509 |
| 2011/0149306 | A1 | * | 6/2011 | Kim .............................. 358/1.6 |

FOREIGN PATENT DOCUMENTS

| JP | SHO 62-143552 | 6/1987 |
| JP | 10-56577 | 4/1998 |
| JP | 11-341222 | 12/1999 |
| JP | 2000-13564 | 1/2000 |
| JP | 2000-316067 | 11/2000 |
| JP | 2001-127963 | 5/2001 |
| JP | 2002-237929 | 8/2002 |
| JP | 2005-184390 | 7/2005 |
| JP | 2009-246723 | 10/2009 |

OTHER PUBLICATIONS

Notification of Reasons for Rejection dated Nov. 8, 2011 received from the Japanese Patent Office from related Japanese Application No. 2010-082121, together with an English-language translation.

* cited by examiner

*Primary Examiner* — Cheukfan Lee
(74) *Attorney, Agent, or Firm* — Scully, Scott, Murphy & Presser, PC

(57) ABSTRACT

An image reader is provided, which includes a light-emitting-timing setting unit configured to divide a non-light-emitting time during which none of light sources emits light in a predetermined reading period into a plurality of segmental non-light-emitting times and set a light-emitting moment separately for each light source as a moment to emit the light in the predetermined reading period, such that the segmental non-light-emitting times are arranged in a dispersed manner in the predetermined reading period, and a controller configured to control each light source to emit the light during a light-emitting time determined separately for each light source at the light-emitting moment set by the light-emitting-timing setting unit.

5 Claims, 15 Drawing Sheets

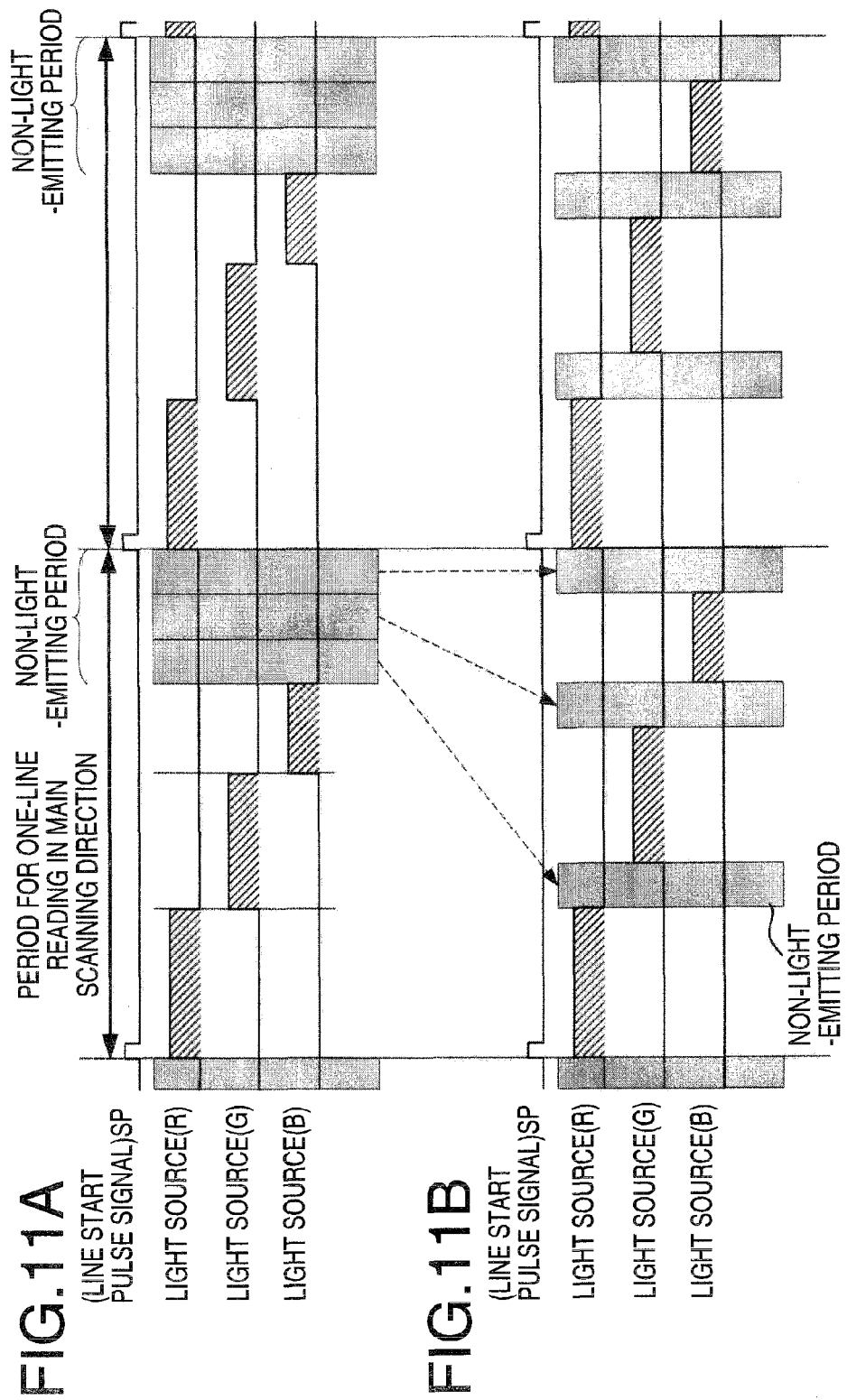

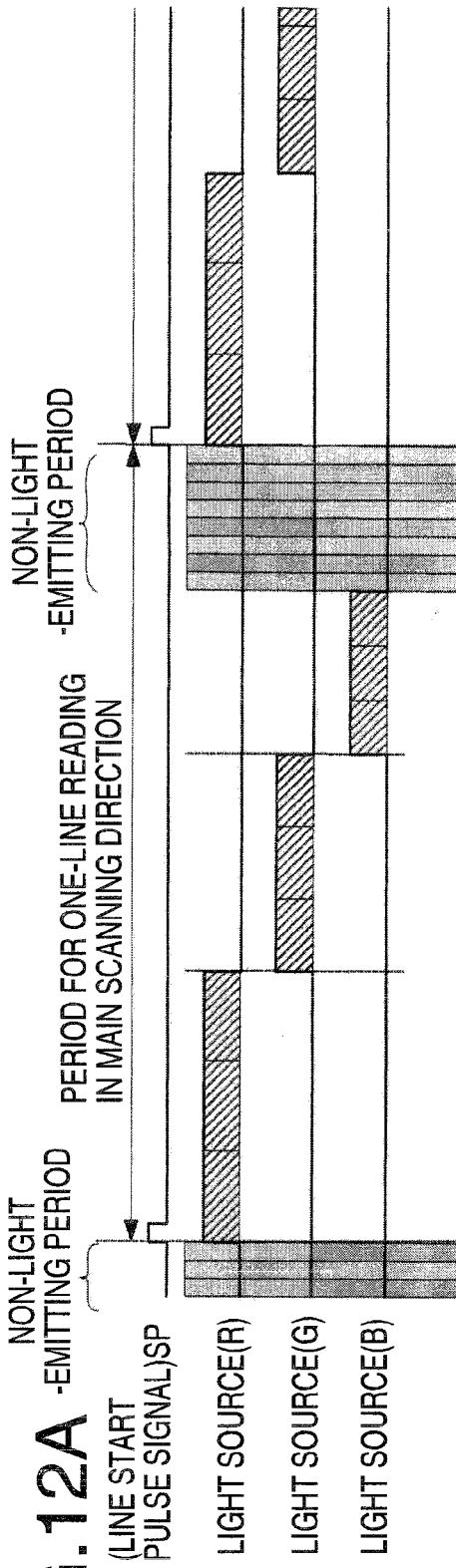
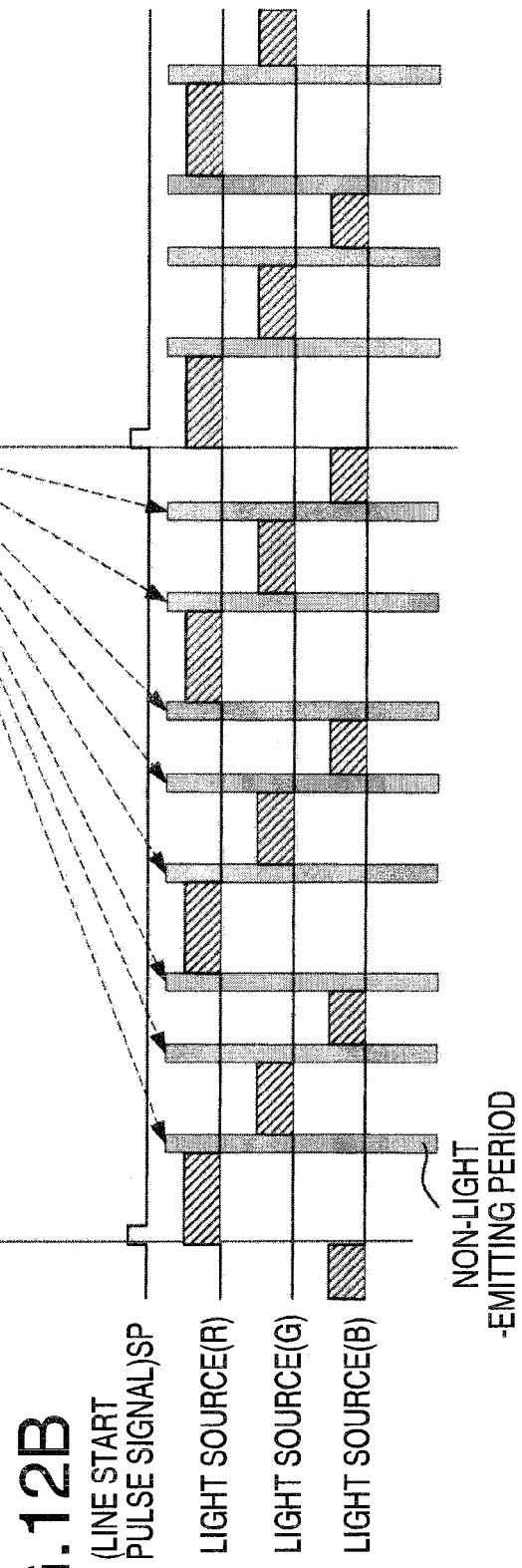

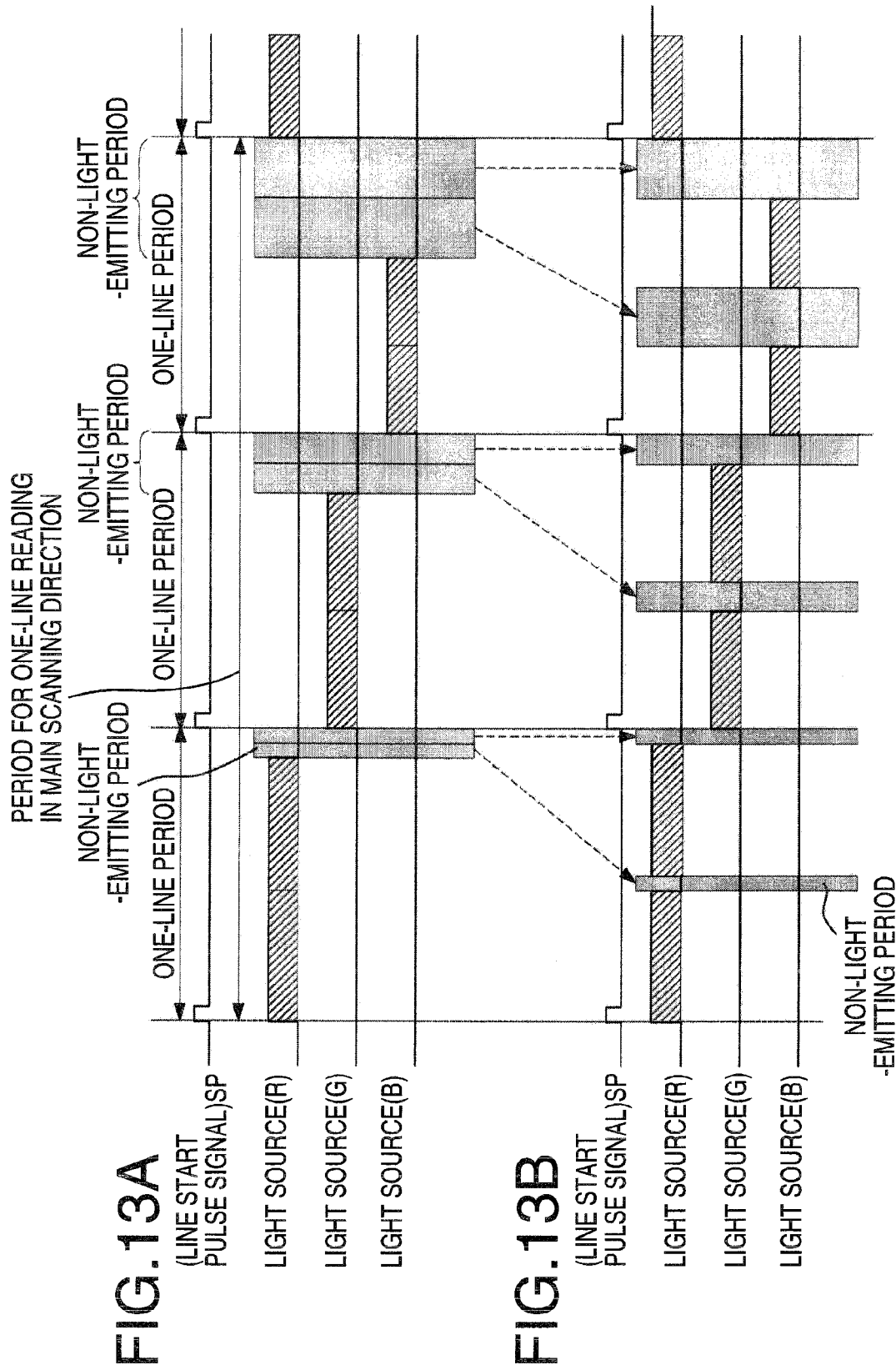

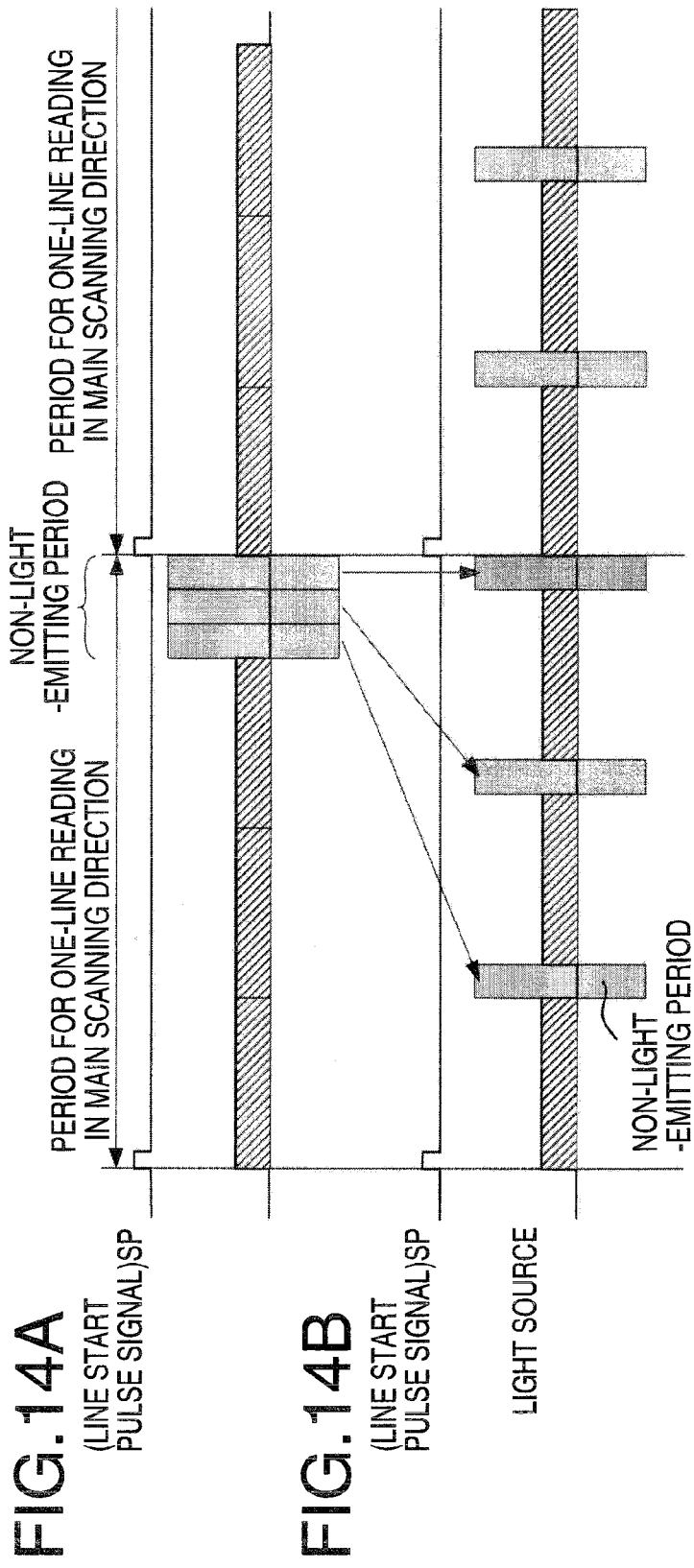

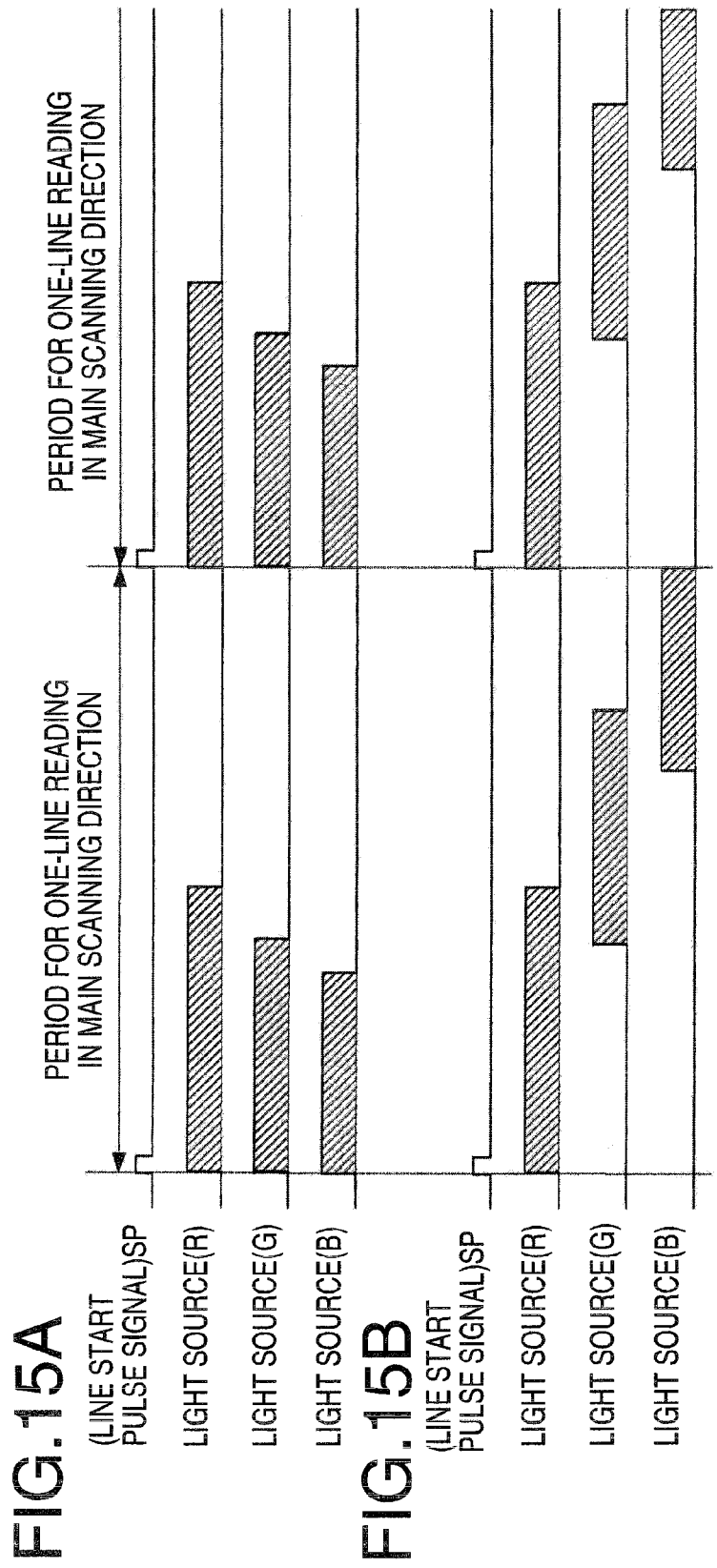

IMAGE READER

CROSS-REFERENCE TO RELATED APPLICATION

This application claims priority under 35 U.S.C. §119 from Japanese Patent Application No. 2010-082121 filed on Mar. 31, 2010. The entire subject matter of the application is incorporated herein by reference.

BACKGROUND

1. Technical Field

The following description relates to one or more image readers configured to read an image of a document sheet, particularly to one or more image readers each of which supplies a predetermined driving current to a plurality of light sources emitting respective different-color light beams to read the image of the document sheet.

2. Related Art

So far, an image reader has been proposed, which includes a reading unit configured to read a document sheet while moving relative to an image on the document sheet. The reading unit includes a plurality of light sources that emit respective different-color light beams, a light introducing portion that introduces the light beams emitted by the light sources onto the document sheet, and a light-receiving portion that has light-receiving elements arranged linearly along a main scanning direction and outputs a reading signal corresponding to a light intensity of a light beam which is reflected from the document sheet and received by each light-receiving element.

In the above-configured image reader, it is possible to detect a distribution of an intended color in the main scanning direction on the document sheet by causing one of three light sources emitting light beams with respective different colors, red (R), green (G), and blue (B) to emit the intended-color light beam and determining the light intensity of the light beam received by each light-receiving element. When performing such a process with respect to each of the three colors while the reading unit, which includes the light sources, the light directing portion, and the light-receiving portion, moves relative the image on the document sheet, the image reader reads the whole image on the document sheet as a color image. In addition, an image reader has been proposed that is configured to read the image on the document sheet as a monochrome image by causing the light sources to sequentially emit the different-color light beams and determining the summation of the light intensities of the different-color light beams received by each light-receiving element.

Further, when employing a circuit configured to supply the same level of driving current to each light source, the image reader has only to include a single unit for adjusting the driving current. Thus, it is possible to provide the image reader with a simplified configuration. However, in such a case, since the respective light intensities of the different-color light beams emitted by the light sources are different from each other, respective light-emitting times during which the light sources emit the light beams in a predetermined reading period of time have to be separately set. Thus, when a light-emitting time is set separately for each of the light sources, it is impossible for all the light sources to emit the light beams over the entire reading period of time. Namely, it might result in a situation where the reading period of time includes a non-light-emitting time during which none of the light sources emits a light beam. Thus, an image reader has been proposed, which is configured to, when reading the image on the document sheet as a color image, set side-by-side respective light-emitting moments at which the light sources emit the light beams, so as to restrain "color shift."

SUMMARY

However, when the reading period of time includes the non-light-emitting time during which none of the light sources emits a light beam, the aforementioned image reader cannot read a portion of the document sheet that faces the light-receiving portion during the non-light-emitting time. Therefore, it might lead to problems such as a problem that the image reader fails to read a thin line extending along the main scanning direction on the document sheet, and Moire fringes formed on the image read by the image reader.

Aspects of the present invention are advantageous to provide one or more improved techniques for an image reader that is configured to read an image on a document sheet by supplying the same level of driving current to a plurality of light sources emitting respective different-color light beams, which techniques make it possible to prevent problems such as a failure in reading a thin line extending along the main scanning direction and formation of Moire fringes.

According to aspects of the present invention, an image reader is provided, an image reader is provided, which includes a reading unit configured to read an image on a document sheet while moving relative to the document sheet in an auxiliary scanning direction, the reading unit including a plurality of light sources each of which is configured to emit light of a wavelength different from wavelengths of the other light sources, a light introducing unit configured to introduce the light emitted by each light source so as to be incident onto the document sheet, and a light receiving unit comprising light receiving elements disposed linearly along a main scanning direction perpendicular to the auxiliary scanning direction, the light receiving unit being configured to receive light reflected from the document sheet and output a reading signal corresponding to a light intensity of the received light, a driving current supplying unit configured to supply a predetermined driving current to each light source, a light-emitting-time determining unit configured to determine a light-emitting time separately for each light source and a non-light-emitting time, in a predetermined reading period, the light-emitting time being a period of time during which one of light sources is required to emit the light such that the light receiving unit receives the reflected light of a light intensity necessary for reading the image on the document sheet in the predetermined reading period under the driving current supplied to the light source from the driving current supplying unit, the non-light-emitting time being a period of time during which none of the light sources is required to emit the light in the predetermined reading period, a light-emitting-timing setting unit configured to divide the non-light-emitting time into a plurality of segmental non-light-emitting times and set a light-emitting moment separately for each light source as a moment to emit the light in the predetermined reading period, such that the segmental non-light-emitting times are arranged in a dispersed manner in the predetermined reading period, and a controller configured to control each light source to emit the light during the light-emitting time determined by the light-emitting-time determining unit at the light-emitting moment set by the light-emitting-timing setting unit.

BRIEF DESCRIPTION OF THE ACCOMPANYING DRAWINGS

Figure 5:
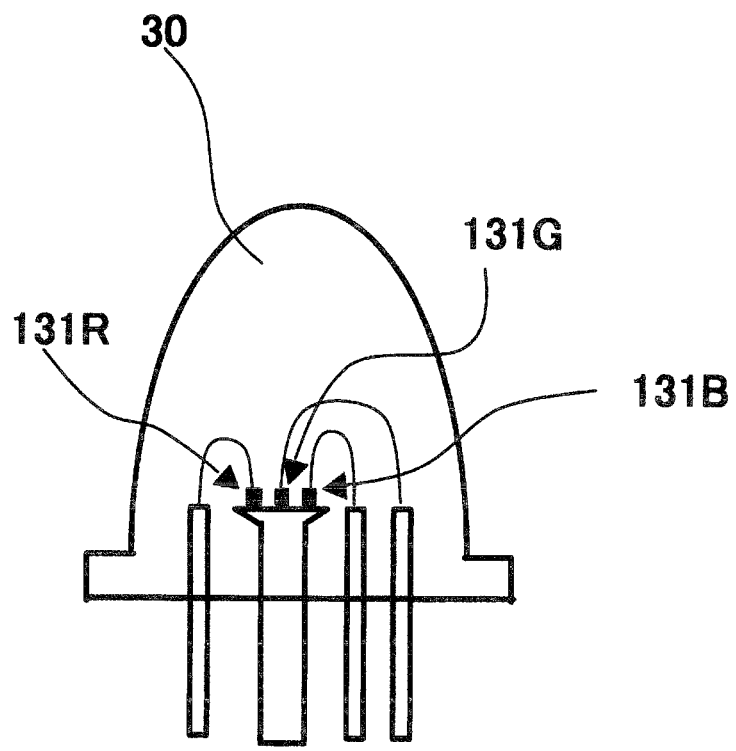

FIG. 5 schematically shows a configuration of an LED lamp of the reading device in the embodiment according to one or more aspects of the present invention.

Figure 6:
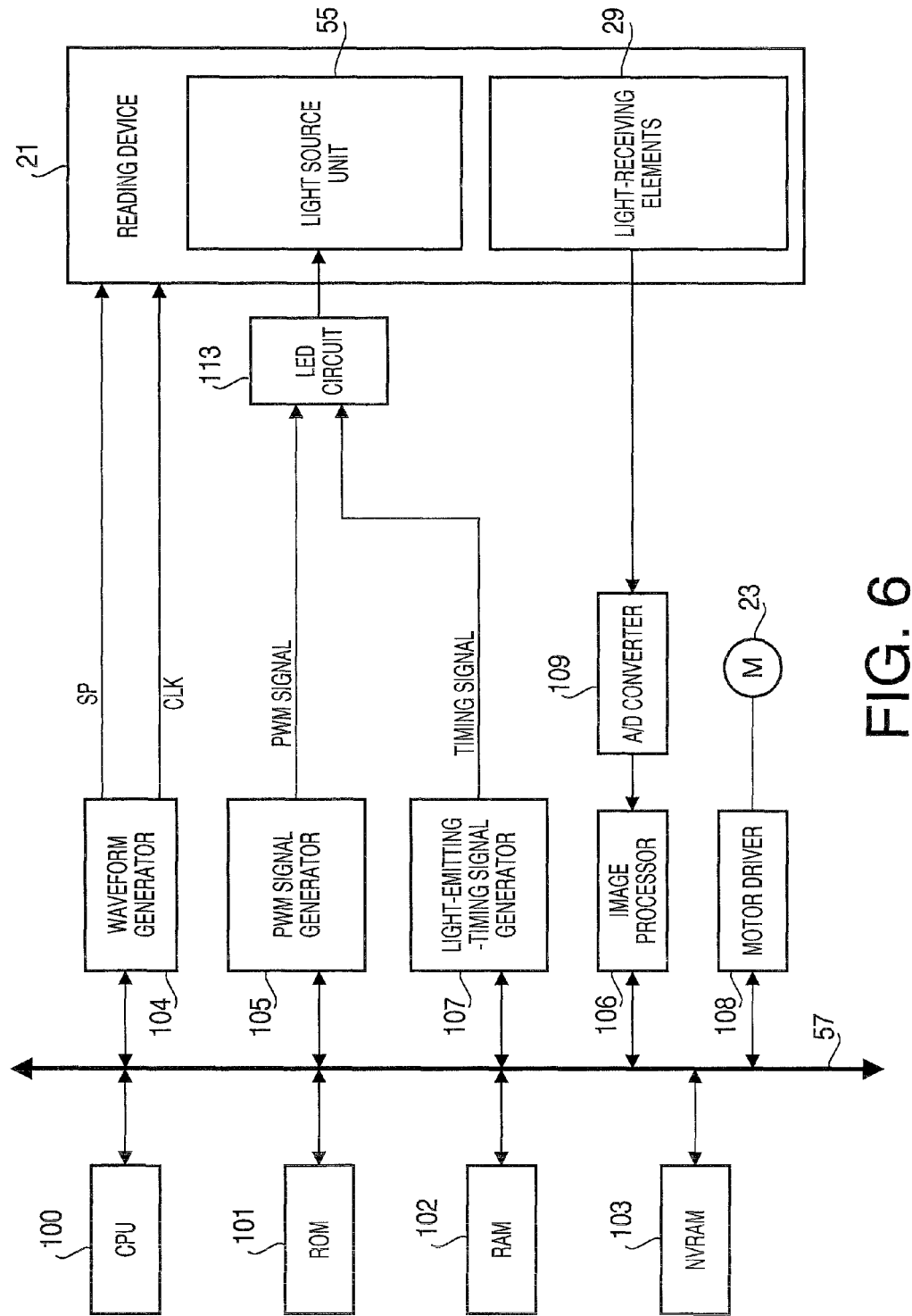

FIG. 6 is block diagram showing a configuration of a control system of the image reader in the embodiment according to one or more aspects of the present invention.

Figure 7:
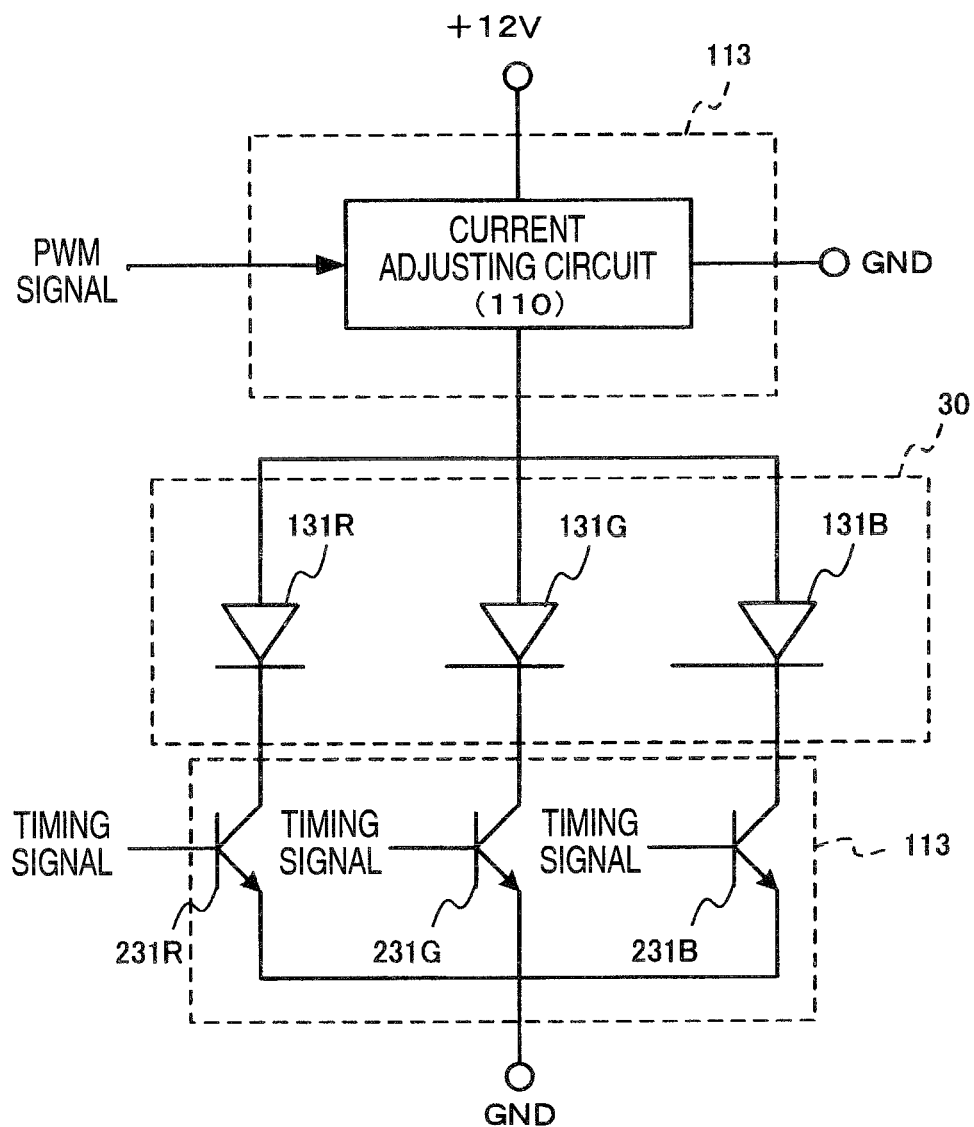

FIG. 7 is a circuit diagram showing a configuration of an LED circuit connected with the LED lamp in the control system of the embodiment according to one or more aspects of the present invention.

Figure 8:
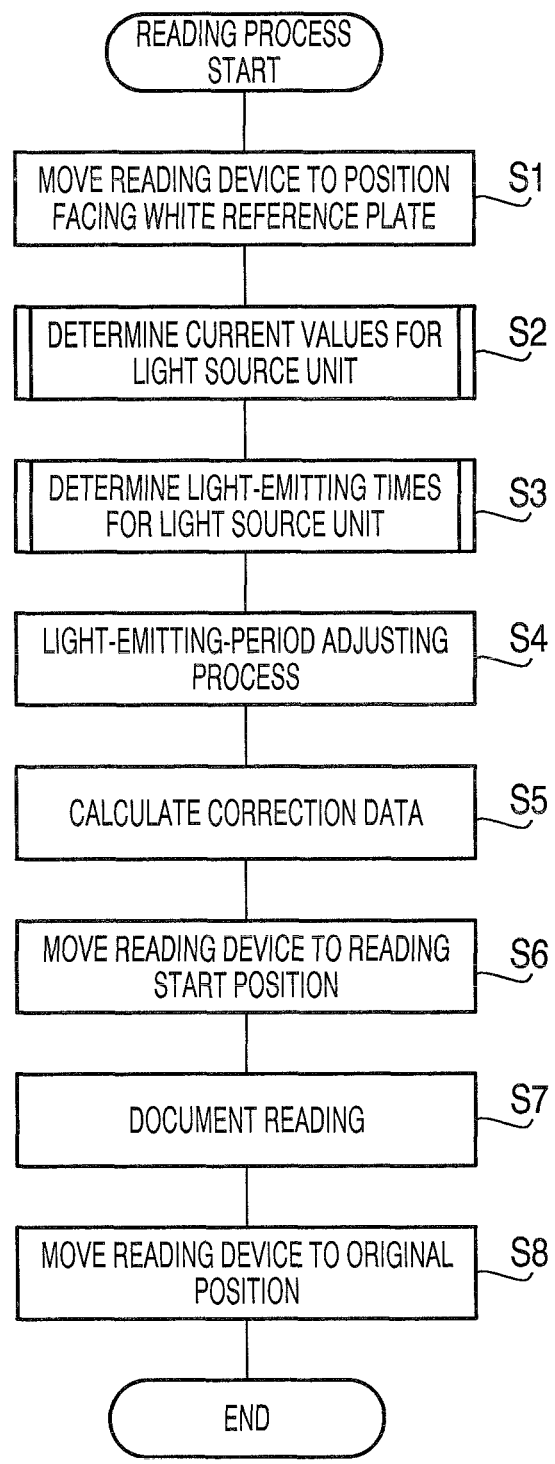

FIG. 8 is a flowchart showing a procedure of a reading process to be executed by the control system in the embodiment according to one or more aspects of the present invention.

Figure 9:
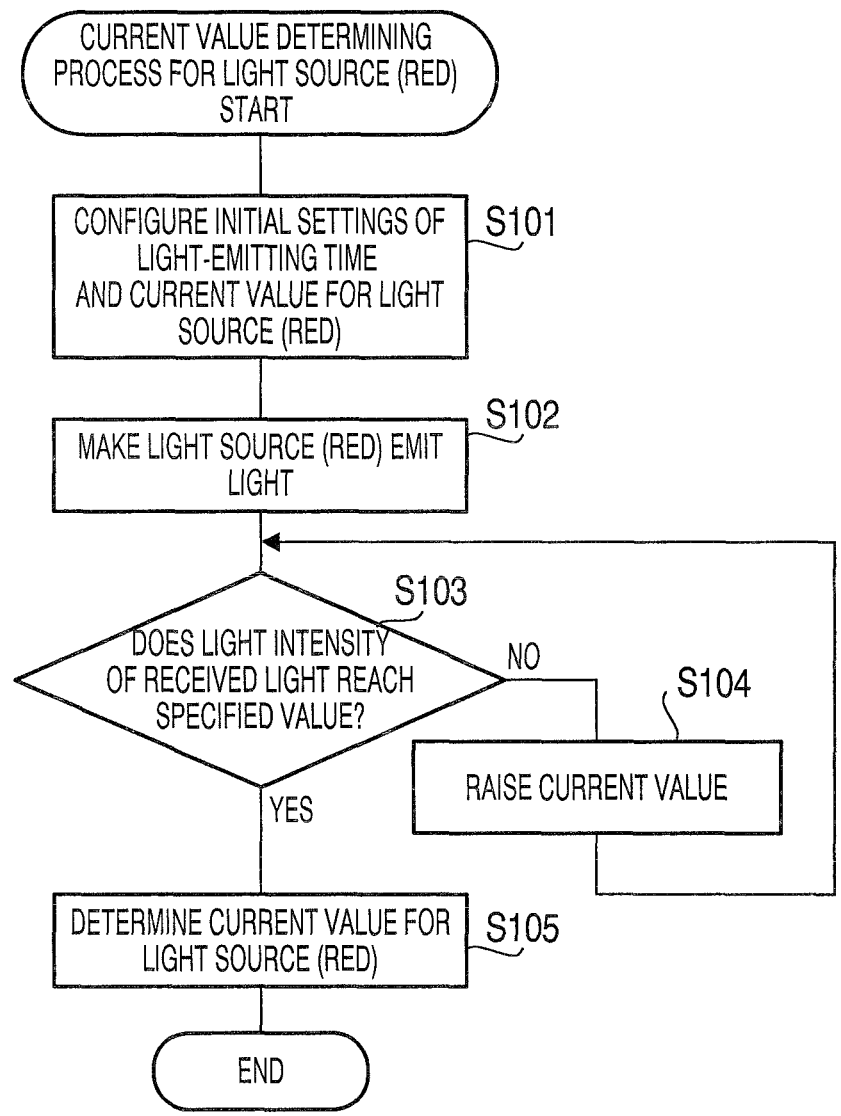

FIG. 9 is a flowchart showing a procedure of a current value determining process to be executed in the reading process by the control system in the embodiment according to one or more aspects of the present invention.

Figure 10:
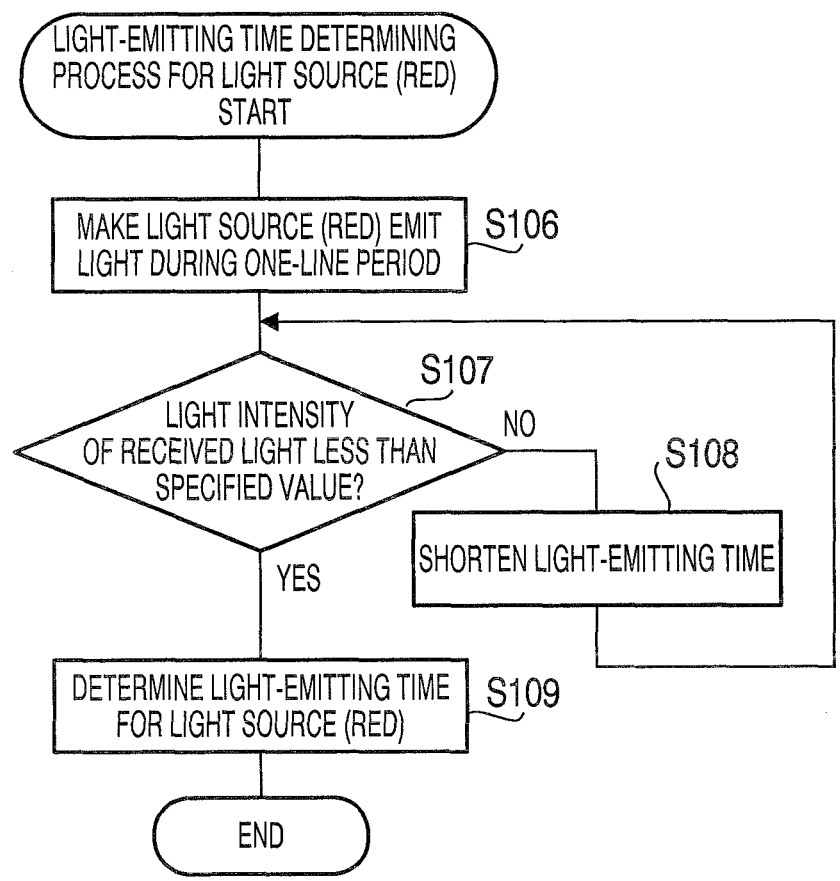

FIG. 10 is a flowchart showing a procedure of a light-emitting-time determining process to be executed in the reading process by the control system in the embodiment according to one or more aspects of the present invention.

FIGS. 11A and 11B are time charts to illustrate a light-emitting-period adjusting process to be executed in the reading process by the control system in the embodiment according to one or more aspects of the present invention.

FIGS. 12A and 12B are time charts to illustrate a light-emitting-period adjusting process to be executed in a reading process in a modification according to one or more aspects of the present invention.

FIGS. 13A and 13B are time charts to illustrate a light-emitting-period adjusting process to be executed in a reading process in a modification according to one or more aspects of the present invention.

FIGS. 14A and 14B are time charts to illustrate a light-emitting-period adjusting process to be executed in a reading process in a modification according to one or more aspects of the present invention.

FIGS. 15A and 15B are time charts to illustrate a light-emitting-period adjusting process to be executed in a reading process in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

[Overall Configuration of Image Reader]

Hereinafter, an embodiment according to aspects of the present invention will be described with reference to the accompany drawings.

Figure 1A:
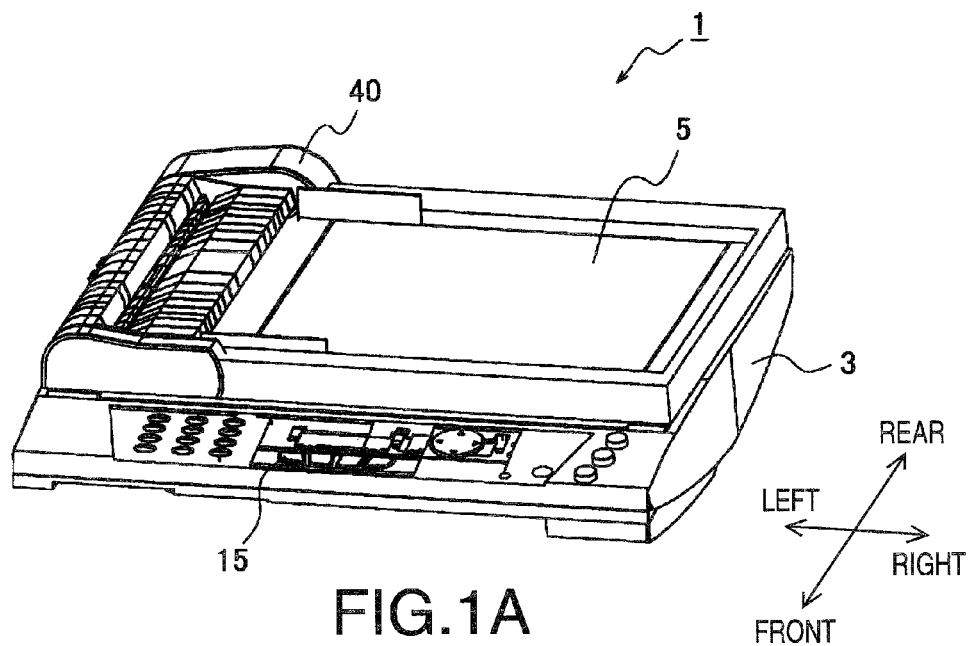
FIGS. 1A and 1B are external views showing a configuration of an image reader in an embodiment according to one or more aspects of the present invention.
Figure 1B:
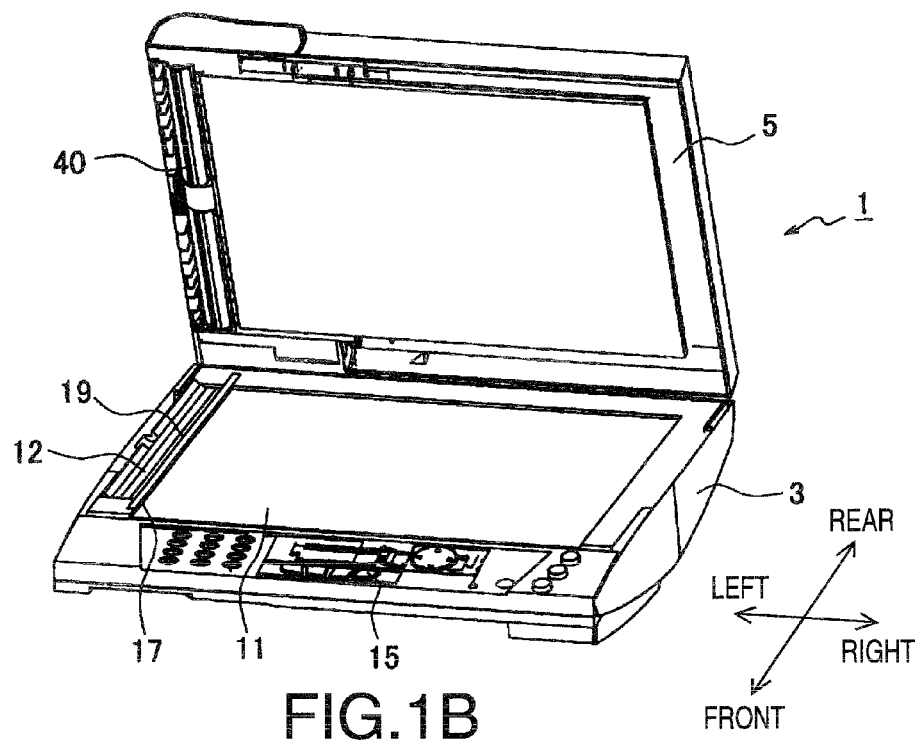
Figure 2:
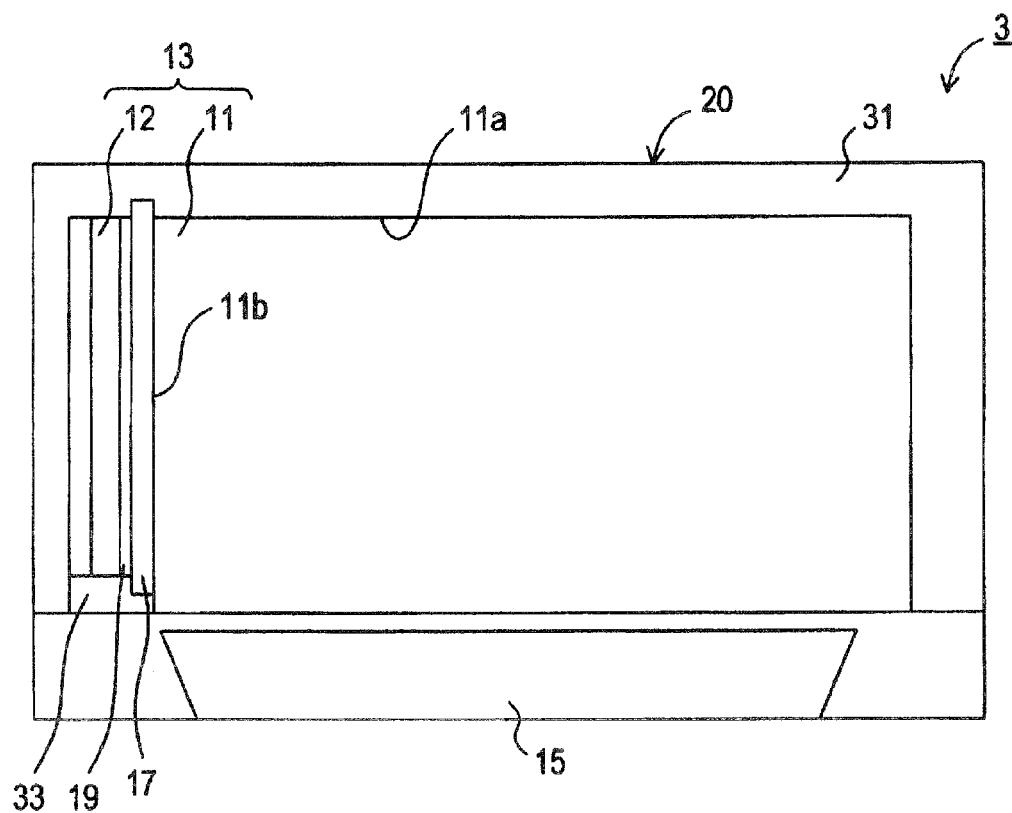
FIG. 2 is a top view showing an upper-side configuration of a device body of the image reader in the embodiment according to one or more aspects of the present invention.
Figure 2:
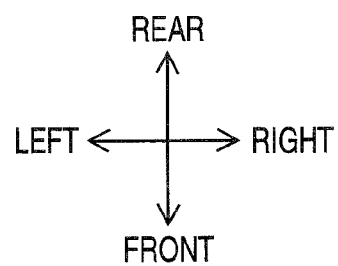

As illustrated in FIGS. 1A, 1B and 2, an image reader 1 of the embodiment is configured as a flatbed type scanner. The image reader 1 includes a device body 3 that has a first reading surface 11 and a second reading surface 12 at an upper side of the device body 3, and a cover 5 provided above the device body 3 in an openable and closable manner.

As shown in FIG. 1A, an upper surface of the device body 3 is covered with the cover 5 in a state where the cover 5 is closed. As depicted in FIGS. 1A and 1B, the cover 5 is provided to be openable and closable around an axis along a left-to-right direction in FIGS. 1A and 1B.

Further, as illustrated in FIGS. 1A and 1B, the device body 3 is provided with an operation unit 15 having various kinds of switches at a front side thereof When a user operates the operation unit 15, the image reader 1 performs an operation corresponding to a command issued through the operation unit 15. Further, as shown in FIG. 2, the first reading surface 11 has an end line 11a (a boundary between the first reading surface 11 and a below-mentioned frame body 31) at a side close to a hinge of the cover 5 and an end line 11b (a boundary between the first reading surface 11 and a below-mentioned positioning member 17) at a side close to the second reading surface 12. The end lines 11a and 11b serve as document reference positions, respectively, which provide positional reference points when a document sheet P is placed on the first reading surface 11.

Figure 3A:
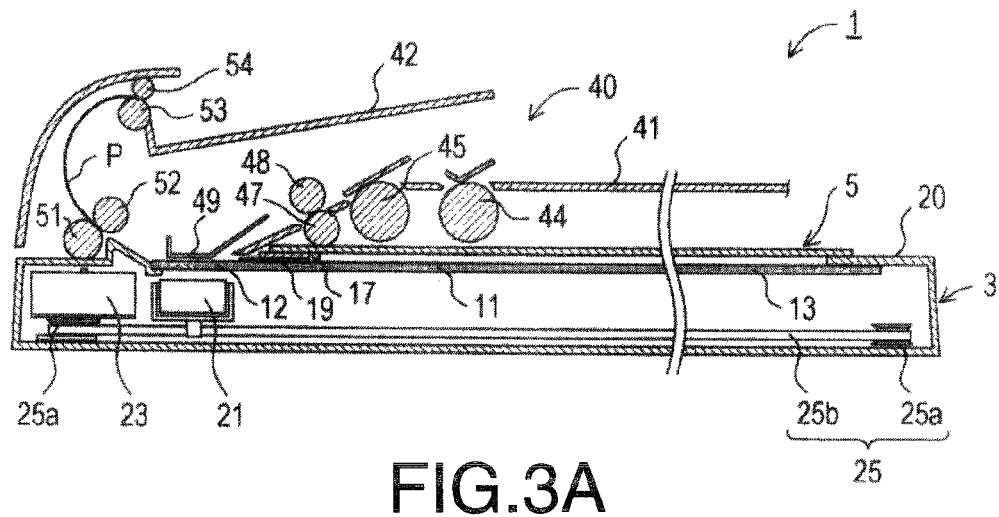
FIGS. 3A and 3B are cross-sectional side views showing a cross-sectional configuration of the image reader along a plane parallel to a vertical direction and a longitudinal direction of the image reader in the embodiment according to one or more aspects of the present invention.
Figure 3B:
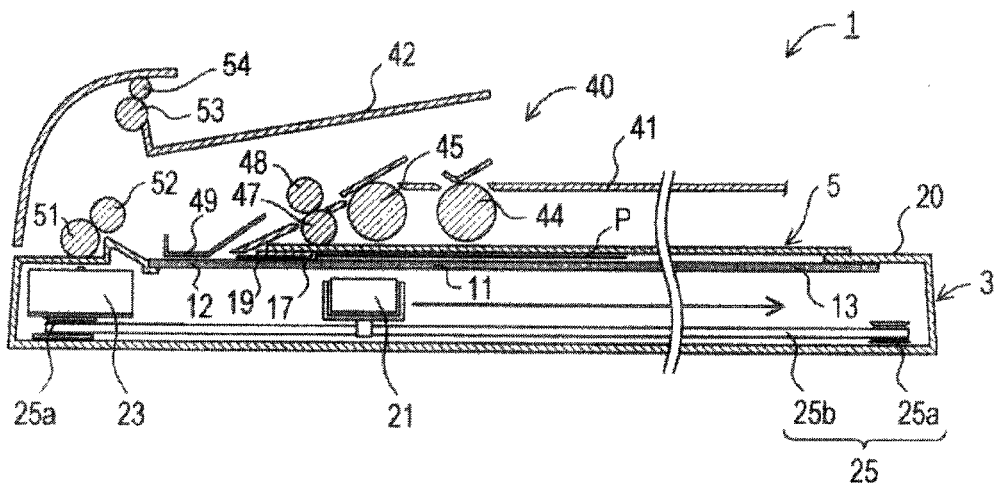

As illustrated in FIGS. 3A and 3B, the device body 3, which is included in the image reader 1, includes a platen glass 13 that forms the first reading surface 11 and the second reading surface 12, a housing 20 that supports the platen glass 13, a positioning member 17 for positioning the document sheet P placed on the first reading surface 11, a white reference plate 19, a reading device 21, and a motor 23 and a belt mechanism 25 that move the reading device 21 in a below-mentioned manner.

Further, as shown in FIG. 2, a rear end (an upper side in FIG. 2) and a right end (a right side in FIG. 2) of the platen glass 13 are pressed downward from an upper side by a frame body 31 that extends from an upper end of the housing 20 toward a center of a bottom surface of the housing 20 so as to be parallel to the bottom surface of the housing 20. Thereby, the rear end and the right end of the platen glass 13 are fixed to the housing 20. Further, a left front end of the platen glass 13 is pressed downward from an upper side by a glass fixing portion 33 that extends from a left front end of the frame body 31. Thereby, the left front end of the platen glass 13 is fixed not to be separated from the housing 20.

A surface of the platen glass 13 is sectioned into the first reading surface 11 and the second reading surface 12, by the positioning member 17 that is detachably attached to the housing 20. The first reading surface 11 is an area configured such that the document sheet P is read when being placed thereon by the user. The first reading surface 11 is provided at a right side of the image reader 1. The second reading surface 12 is an area configured such that the document sheet P is read when being conveyed thereto by a document feeder 40 that is provided to the cover 5. The second reading surface 12 is provided at a left side of the image reader 1.

The reading device 21 is housed to be movable in a left-to-right direction (an auxiliary scanning direction) at a side of a back surface of the first and second reading surfaces 11 and 12 (i.e., a back surface of the platen glass 13) inside the housing 20. The reading device 21 is fixed to a belt 25b that is wound around a pair of rollers 25a of the belt mechanism 25. Thus, the reading device 21 moves in the left-to-right direction of the image reader 1 together with the belt 25b, which is turned by a driving force generated by the motor 23.

As illustrated in FIG. 3A, when reading the document sheet P conveyed onto the second reading surface 12 by the document feeder 40, the reading device 21 is moved and fixed under the second reading surface 12. Further, as depicted in FIG. 3B, when reading the document sheet P placed on the first reading surface 11, the reading device 21 is moved in the left-to-right direction beneath the first reading surface 11 (at the back surface side of the first reading surface 11) by the motor 23 and the belt mechanism 25.

As described above, the cover 5 is provided with the document feeder 40. In the following manner, the document feeder 40 feeds the document sheet P placed on a feed tray 41 onto the second reading surface 12, and ejects the document sheet P, read on the second reading surface 12 by the reading device 21, onto a catch tray 42.

The document feeder 40 includes pickup rollers 44 and 45 at a starting point of a feeding path. The document sheet P placed on the feed tray 41 is conveyed downstream on the feeding path, by the pickup rollers 44 and 45. The document sheet P, fed by the pickup rollers 44 and 45, is further conveyed downstream on the feeding path, by feed rollers 47 and 48.

At a downstream side relative to the feed rollers 47 and 48 on the feeding path, there is an upper plate 49 provided to face the second reading surface 12 with a predetermined width of gap between the upper plate 49 and the second reading surface 12. The document sheet P, fed by the feed rollers 47 and 48, passes through the gap between the upper plate 49 and the second reading surface 12, and is conveyed by a pair of feed rollers 51 and 52 that are provided downstream relative to the gap on the feeding path. Subsequently, the document sheet P is ejected onto the catch tray 42 by a pair of ejection rollers 53 and 54.

Figure 4A:
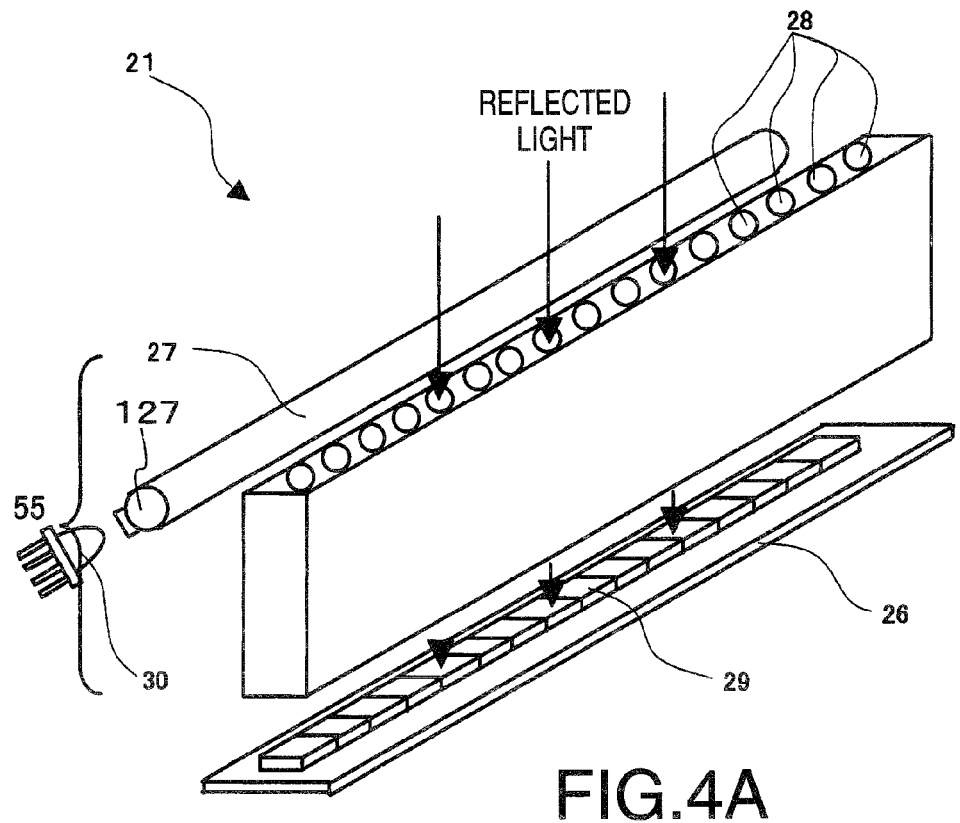
FIG. 4A is a perspective view showing a configuration of a reading device of the image reader in the embodiment according to one or more aspects of the present invention.
Figure 4B:
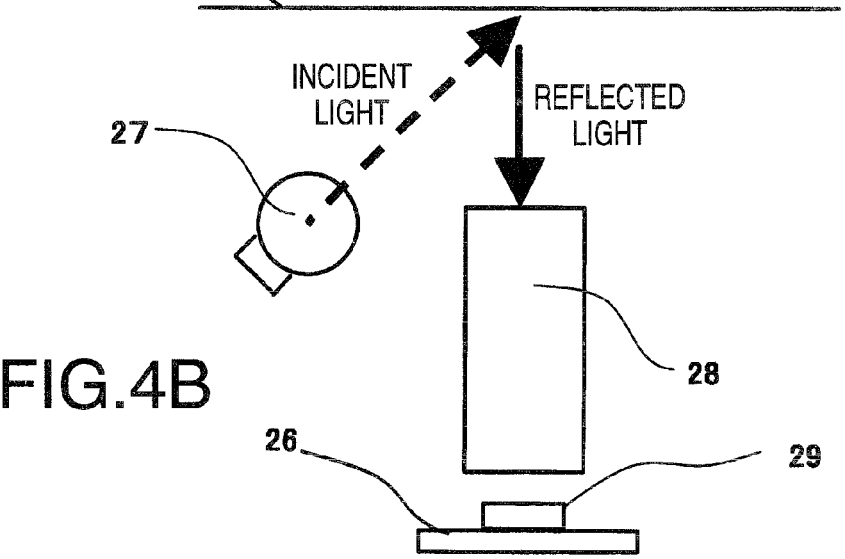
FIG. 4B is a side view of the reading device when viewed from a main scanning direction of the image reader in the embodiment according to one or more aspects of the present invention.

As shown in FIGS. 4A and 4B, the reading device 21 includes lenses 28, a substrate 26, light-receiving elements 29 formed on the substrate to detect light converged by the lenses 28, a cylindrical light introducing member 27 disposed along an array of the lenses 28, and an LED lamp 30 disposed close to an end of the light introducing member 27. It is noted that in the following description, the light introducing member 27 and the LED lamp 30 may be generically referred to as a light source unit 55.

The light introducing member 27 is configured to introduce therethrough light emitted by the LED lamp 30, and make the light reflected and scattered such that the light is incident linearly onto the document sheet P. The lenses 28 and the light-receiving elements 29 are arranged linearly along the main scanning direction over a range as long as a dimension of the platen glass 13 in a front-to-rear direction. Therefore, as shown in FIG. 4B, the light-receiving elements 29 detect the light that is emitted by the light introducing member 27, incident onto the document sheet P, and then reflected from the document sheet P.

As shown in FIG. 5, the LED lamp 30 includes LED chips 131R, 131G, and 131B that emit light with respective different wavelengths, i.e., light of a color of red (R), light of a color of green (G), light of a color of blue (B). The LED chips 131R, 131G, and 131B are bonded onto a metal lead, which are sealed with a transparent resin formed in a lens shape.

(Configuration of Control System for Image Reader)

As shown in FIG. 6, the image reader 1 includes a CPU 100, a ROM 101, a RAM 102, an NVRAM 103, a waveform generator 104, a PWM signal generator 105, an image processor 106, a light-emitting-timing signal generator 107, and a motor driver 108, which are interconnected via a bus line 57. The light-receiving elements 29 of the reading device 21 are connected with the image processor 106 via an A/D converter 109. The PWM signal generator 105 and the light-emitting-timing signal generator 107 are connected with the light source unit 55 of the reading device 21 via an LED circuit 113.

The waveform generator 104 provides the reading device 21 with a reference clock CLK and a line start pulse signal SP having a one-line period based on the reference clock CLK. It is noted that the reference clock CLK is also input into the motor driver 108 configured to drive the motor 23, and serves as a timing reference signal in moving the reading device 21. Further, the PMW signal generator 105 generates a driving current for the light source unit 55 as a pulse width modulation (PWM) signal, and inputs the driving current into the LED circuit 113.

As illustrated in FIG. 7, the LED circuit 113 includes a current adjusting circuit 110 configured to supply, as a driving current, a constant current corresponding to the PWM signal issued by the PWM signal generator 105, and three transistors 231R, 231G, and 231B configured to switch between ON/OFF states in response to timing signals which are issued by the light-emitting-timing signal generator 107 and separately input into bases of the transistors 231R, 231G, and 231B, respectively. The transistor 231R has a collector connected with a cathode of the LED chip 131R. The transistor 231G has a collector connected with a cathode of the LED chip 131E The transistor 231B has a collector connected with a cathode of the LED chip 131B.

The current adjusting circuit 110 is connected with an electric power supply of +12 V and a ground GND. The current adjusting circuit 110 supplies the driving current to anodes of the LED chips 131R, 131G, and 131B. Further, the transistors 231R, 231G, and 231G have respective emitters connected with the ground GND. Therefore, when the transistor 231R is set ON, the current adjusting circuit 110 supplies the driving current to the LED chip 131R such that the LED chip 131R emits light. The LED chips 131G and 131B work in the same manner.

Referring back to FIG. 6, since digital signals, into which analog read signals from the light-receiving elements 29 are converted through the A/D converter 109, are issued separately with respect to each color (R, G, and B), the image processor 106 processes the digital signals to convert the digital signals issued separately with respect to each color into three-color-integrated information corresponding to one line in the main scanning direction. Further, by driving the motor 23 based on the reference clock CLK, the motor driver 108 moves the reading device 21 in the auxiliary scanning direction.

(Processes in Control System)

Subsequently, an explanation will be provided about processes that the CPU 100 executes based on the programs stored on the ROM 101. FIG. 8 is a flowchart showing a procedure of a reading process that the CPU 100 executes in response to an instruction to read a document image. As shown in FIG. 8, initially in the process, in S1, the CPU 100 controls the motor driver 108 to drive the motor 23 such that the reading device 21 is moved to a position facing the white reference plate 19. In a next step S2, the CPU 100 performs a current value determining process to determine the values of currents (hereinafter, may be referred to as "current values) to be supplied to the light source unit 55.

FIG. 9 is a flowchart showing a procedure of a current value determining process to determine a current value for the red (R) color. It is noted that in S2, such a current value determining process is performed for each of the colors, green (G) and blue (B) as well in the same manner. As shown in FIG. 9, in the process, firstly, in S101, the CPU 100 configures initial settings of a light-emitting time of the LED chip 131R and a current value of the driving current for the LED chip 131R. An initial value of the light-emitting time is set, for instance, to the aforementioned one-line period (which is set to a predetermined time of period depending on modes such as a color reading mode and a monochrome reading mode). An initial value of the driving current for the LED chip 131R is set, for instance, to a minimum value that the current adjusting circuit 110 can supply to the LED chip 131R.

In S102, the CPU 100 controls the light-emitting-timing signal generator 107 to turn on the transistor 231R such that the LED chip 131R emits light. In S103, the CPU 100 determines whether the light intensity of the light received by the light-receiving elements 29 reaches a previously-specified value. It is noted that the specified value is set to a maximum output value (255) of the A/D converter 109.

When the CPU 100 initially goes to S103, since the current value is set to the minimum value in S102, the CPU 100 determines that the light intensity of the received light does not reach the specified value (S103: No), and goes to S104. In S104, the CPU 100 raises, by a predetermined value, the current to be supplied to the LED chip 131R via the current adjusting circuit 110, by adjusting the PWM signal. Then, the CPU 100 goes back to S103. Thus, when determining that the light intensity of the received light reaches the specified value (S103: Yes) while repeatedly executing S103 and S104, the CPU 100 determines in S105 a current value at that time as the current value for the LED chip 101R. Thereafter, the CPU 100 terminates the current value determining process.

Referring back to FIG. 8, in S2, the CPU 100 performs the current value determining process for each of the colors, green (G) and blue (B) as well in the same manner. Then, the CPU 100 determines the maximum value of the current values determined for the colors red (R), green (G), and blue (B) as a value of the aforementioned constant driving current that the current adjusting circuit 110 supplies. In S3, the CPU 100 performs a light-emitting-time determining process to determine the light-emitting time for the light source unit 55.

FIG. 10 is a flowchart showing a procedure of a light-emitting-time determining process for the color of red (R). It is noted that in S3, the CPU 100 performs the light-emitting-time determining process for the colors, green (G) and blue (B) as well in the same manner. As illustrated in FIG. 10, initially in the process, in S106, the CPU 100 causes the LED chip 131R to emit light during the one-line period. In S107, the CPU 100 determines whether the light intensity of the light received during the one-line period is less than the aforementioned specified value. When determining that the light intensity of the light received during the one-line period is not less than the aforementioned specified value (S107: No), the CPU 100 shortens the light-emitting time for the LED chip 131R in the one-line period by a predetermined time of period, the CPU 100 goes back to S107. When determining that the light intensity of the light received during the one-line period is less than the specified value (S107: Yes) while repeatedly executing S107 and S108, the CPU 100 determines the light-emitting time at that time as the light-emitting time for the LED chip 131R. Thereafter, the CPU 100 terminates the light-emitting-time determining process.

Referring back to FIG. 8, in S3, the CPU 100 performs the light-emitting-time determining process for each of the colors, green (G) and blue (B) as well in the same manner. Then, the CPU 100 stores the determined light-emitting times on the RAM 102 in association with the colors, red (R), green (G), and blue (B), respectively. It is noted that in the light-emitting-time determining process, even the light-emitting time for a color for which the current value is determined in S2 to be higher than the current value for any other color (i.e., the light-emitting time for a color with the highest current value determined therefor) may not necessarily correspond to the one-line period. In S4, the CPU 100 performs the following light-emitting-period adjusting process.

FIGS. 11A and 11B are time charts to illustrate a light-emitting-period adjusting process in which the CPU 100 causes the LED chips 131R, 131G, and 131B to sequentially emit light during the one-line period, and reads the overall light intensity of the reflected light of each color as a monochrome image. It is noted that in monochrome image reading, the one-line period between adjacent two line start pulse signals SP corresponds to a period of time taken for a single reading operation in the main scanning direction.

As exemplified in FIG. 11A, even though the LED chips 131R, 131G, and 131B are made sequentially and continuously emit light in an initial phase of the one-line period such that each light-emitting period does not overlap any other light-emitting period, a non-light-emitting period during which none of the LED chips 131R, 131G, and 131B emits light may exist in a terminal phase of the one-line period. Such a non-light-emitting period might lead to Moire fringes. Thus, as exemplified in FIG. 11B, in S4, the CPU 100 sets the light-emitting period for each color during the one-line period such that the non-light-emitting period is divided evenly, for instance, into three periods, each of which is placed in a dispersed manner between adjacent two of the light-emitting periods for the colors, red (R), green (G), and blue (B). Therefore, in the embodiment, it is possible to disperse the non-light-emitting periods and restrain formation of Moire fringes. It is noted that in FIGS. 11A and 11B, the light-emitting period for each color is indicated by a hatching pattern, and each non-light-emitting period is indicated by a filled pattern.

Referring back to FIG. 8, in S5, the CPU 100 calculates correction data for perform known corrections such as shading correction. In a subsequent step S6, the CPU 100 controls the motor driver 108 to drive the motor 23 such that the reading device 21 is moved to a reading start position (e.g., a position beneath the second reading surface 12). In S7, the CPU 100 performs an operation of reading the document sheet P by making the LED chips 131R, 131G, and 131B emit light during the respective light-emitting periods adjusted in S4 while feeding the document sheet P at a constant speed with the document feeder 40 or moving the reading device 21 in the auxiliary scanning direction with the motor 23. In S8, when having moved the reading device 21, the CPU 100 moves the reading device 21 back to an original position, and thereafter terminates the present process shown in FIG. 8.

(Effects and Modifications)

As described above, in the image reader 1 of the embodiment, it is possible to prevent problems such as a failure in reading a thin line extending along the main scanning direction and formation of Moire fringes in a preferable manner, since the non-light-emitting period is divided into a plurality of periods, each of which is placed in a dispersed manner between adjacent two of the light-emitting periods for the colors, red (R), green (G), and blue (B). Further, in the embodiment, since the non-light-emitting period is evenly divided into a plurality of periods that are dispersed within the one-line period, it is possible to prevent the problems such as a failure in reading a thin line extending along the main scanning direction and formation of Moire fringes in a more preferable manner.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein.

For example, the non-light-emitting period may be divided unevenly. Further, the non-light-emitting period may be divided and dispersed more finely in the following manners.

In an example shown in FIGS. 12A and 12B, the light-emitting period for each color is divided into three periods, and the non-light-emitting period is divided into eight periods. Then, the three divided light-emitting periods for each color (the nine divided light-emitting periods in total) and the eight divided non-light-emitting periods are arranged alternately in the following order: a light-emitting period for red (R), a non-light-emitting period, a light-emitting period for green (G), a non-light-emitting period, a light-emitting period for blue (B), a non-light-emitting period, a light-emitting period for red (R), . . . . In this case, since the non-light-emitting period is divided and dispersed more finely, it is possible to prevent the problems such as a failure in reading a thin line extending along the main scanning direction and formation of Moire fringes in a more preferable manner.

FIGS. 13A and 13B are time charts showing a light-emitting-period adjusting process (S7) for color image reading. In this case, a period of time taken for reading one line in the main scanning direction may be set as a time resulting from multiplying the one-line period by the number (three) of the LED chips 131R, 131G, and 131B. Further, in this case, one of the LED chips 131R, 131G, and 131B may emit light in each one-line period. Thus, the line start pulse signal SP is provided to the reading device 21 every one-line period, and in response to the line start signal SP, the reading signal is output. Hence, the reading signal corresponding to the reflected light of each color is sequentially input into the image processor 106 via the A/D converter 109.

Further, in this process, the non-light-emitting period for each color may be divided into two (or more) segmental periods, and the light-emitting period for each color may be divided into two (or more) segmental periods, such that the segmental non-light-emitting periods and the segmental light-emitting periods may alternately be arranged. In this case as well, since the non-light-emitting period is divided and dispersed, it is possible to prevent the problems such as a failure in reading a thin line extending along the main scanning direction and formation of Moire fringes.

Further, as exemplified in FIGS. 14A and 14B, monochrome image reading may be performed, for instance, with only the green (G) light being selectively applied as needed. In this case, even when the aforementioned steps S2 and S3 are executed with respect to the single color, i.e., green (G), a non-light-emitting period is formed in determining the light-emitting time for fine adjustment of the current value after coarse adjustment of the current value. In this case as well, as exemplified in FIGS. 14A and 14B, by dividing the non-light-emitting period into segmental periods (three segmental periods in the example shown in FIGS. 14A and 14B) and dispersing the fine periods, it is possible to prevent the problems such as a failure in reading a thin line extending along the main scanning direction and formation of Moire fringes.

Additionally, owing to the properties of the LED chips 131R, 131G, and 131B (which may vary across the ages), the light-emitting time determined in S3 for each color may be long as exemplified in FIG. 15A. In this case, a non-light-emitting time, which is substantially determined at the same time when the light-emitting time for each color is determined in S3, is zero. Therefore, in this case, in the light-emitting-period adjusting process (S7), as exemplified in FIG. 15B, the light-emitting period for each color may be arranged such that the non-light-emitting period during which none of the LED chips 131R, 131G, and 131B emits light does not exist. In this case as well, it is possible to prevent the problems such as a failure in reading a thin line extending along the main scanning direction and formation of Moire fringes.

In addition, aspects of the present invention may be applied to various image readers. The various image readers may include an image reader configured to perform only an image reading operation using an automatic document feeder (ADF) (sometimes referred to as "ADF reading") in which operation the reading device 21 is not moved by the motor 23. Further, the various image readers may include a facsimile machine, and an image reader applied to a copy machine.

In the aforementioned embodiment, the light-emitting period is set based on the previously-specified value (255) as the maximum output value of the A/D converter 109. However, the driving current and the light-emitting period for each light source may be adjusted based on any value equal to or less than the maximum output value.

What is claimed is:

1. An image reader comprising:
a reading unit configured to read an image on a document sheet while moving relative to the document sheet in an auxiliary scanning direction,
wherein the reading unit comprises:
a plurality of light sources each of which is configured to emit light of a wavelength different from wavelengths of the other light sources;
a light introducing unit configured to introduce the light emitted by each light source so as to be incident onto the document sheet; and
a light receiving unit comprising light receiving elements disposed linearly along a main scanning direction perpendicular to the auxiliary scanning direction, the light receiving unit being configured to receive light reflected from the document sheet and output a reading signal corresponding to a light intensity of the received light;
a driving current supplying unit configured to supply a predetermined driving current to each light source;

a light-emitting-time determining unit configured to determine a light-emitting time separately for each light source and a non-light-emitting time, in a predetermined reading period,
    wherein the light-emitting time is a period of time during which one of light sources is required to emit the light such that the light receiving unit receives the reflected light of a light intensity necessary for reading the image on the document sheet in the predetermined reading period under the driving current supplied to the light source from the driving current supplying unit, and
    wherein the non-light-emitting time is a period of time during which none of the light sources is required to emit the light in the predetermined reading period;
a light-emitting-timing setting unit configured to divide the non-light-emitting time into a plurality of segmental non-light-emitting times and set a light-emitting moment separately for each light source as a moment to emit the light in the predetermined reading period, such that the segmental non-light-emitting times are arranged in a dispersed manner in the predetermined reading period; and
a controller configured to control each light source to emit the light during the light-emitting time determined by the light-emitting-time determining unit at the light-emitting moment set by the light-emitting-timing setting unit.

2. The image reader according to claim 1,
wherein the light-emitting-timing setting unit is configured to divide the light-emitting time for each light source into a plurality of segmental light-emitting times and set the light-emitting moment separately for each light source, such that the segmental light-emitting times and the segmental non-light-emitting times are arranged alternately in the predetermined reading period.

3. The image reader according to claim 2,
wherein the reading unit is configured to make each light source emit the light sequentially at intervals of a specified period and make the light receiving unit output the reading signal corresponding to the light intensity of the light, reflected from the document sheet, which the light receiving unit receives cumulatively during each specified period,
wherein the predetermined reading period is a period resulting from multiplying the specified period by a total number of the light sources, and
wherein the light-emitting-timing setting unit is configured to divide the light-emitting time of each light source into the plurality of segmental light-emitting times, divide the non-light-emitting time into the plurality of segmental non-light-emitting times, and set the light-emitting moment separately for each light source, such that the segmental light-emitting times for one of the light sources and the segmental non-light-emitting times are arranged alternately in the specified period.

4. The image reader according to claim 1,
wherein the light-emitting-timing setting unit is configured to divide the non-light-emitting time evenly into the plurality of segmental non-light-emitting times and set the light-emitting moment separately for each light source, such that the even segmental non-light-emitting times are arranged in a dispersed manner in the predetermined reading period.

5. The image reader according to claim 1,
wherein the reading unit is configured to make each light source emit the light in the predetermined reading period and make the light receiving unit output the reading signal corresponding to the light intensity of the light, reflected from the document sheet, which the light receiving unit receives cumulatively during the predetermined reading period, and
wherein the light-emitting-timing setting unit is configured to divide the non-light-emitting time into the plurality of segmental non-light-emitting times and set the light-emitting moment separately for each light source, such that the respective light-emitting times of the light sources are arranged in the predetermined reading period so as not to overlap each other and that the segmental non-light-emitting times are arranged in a dispersed manner in the predetermined reading period.

* * * * *